(12) United States Patent
Jones et al.

(10) Patent No.: US 12,005,374 B1
(45) Date of Patent: Jun. 11, 2024

(54) VEHICLE RELAY RACING SYSTEM AND METHOD THEREOF

(71) Applicants: Darrell Jones, Wichita Falls, TX (US); Shay Jones, Wichita Falls, TX (US); Bjorn Shoulders, Antioch, TN (US)

(72) Inventors: Darrell Jones, Wichita Falls, TX (US); Shay Jones, Wichita Falls, TX (US); Bjorn Shoulders, Antioch, TN (US)

( * ) Notice: Subject to any disclaimer, the term of this patent is extended or adjusted under 35 U.S.C. 154(b) by 343 days.

(21) Appl. No.: 17/491,951

(22) Filed: Oct. 1, 2021

(51) Int. Cl.
*A63K 1/00* (2006.01)
*A47C 3/18* (2006.01)
*A63F 13/90* (2014.01)
*B60N 2/14* (2006.01)
*B62D 63/02* (2006.01)
*A63F 13/803* (2014.01)

(52) U.S. Cl.
CPC ............... *A63K 1/00* (2013.01); *A47C 3/18* (2013.01); *A63F 13/90* (2014.09); *B60N 2/143* (2013.01); *B60N 2/146* (2013.01); *B62D 63/02* (2013.01); *A63F 13/803* (2014.09); *A63F 2300/8017* (2013.01)

(58) Field of Classification Search
CPC .... A63K 1/00; A47C 3/18; A47C 7/48; A47C 7/62; A47C 13/00; B60N 2/143; B60N 2/146; A63F 13/90; A63F 13/218; B62D 62/02

USPC .................. 472/85; 297/244; 463/1
See application file for complete search history.

(56) References Cited

U.S. PATENT DOCUMENTS

| 6,345,864 B1* | 2/2002 | Rivera ................... A47D 13/00 297/130 |
| 7,731,447 B1* | 6/2010 | Dunwoody .............. A63K 1/00 404/1 |
| 9,694,294 B1* | 7/2017 | Petrov ................. A63F 13/5255 |
| 2017/0003739 A1* | 1/2017 | Schmidt .................. G06T 19/20 |
| 2018/0369702 A1* | 12/2018 | Hake ...................... A63G 25/00 |
| 2019/0130741 A1* | 5/2019 | Eastling ................ H04W 4/022 |
| 2020/0317091 A1* | 10/2020 | Aktas ................. B60N 2/02246 |

* cited by examiner

*Primary Examiner* — Kien T Nguyen
(74) *Attorney, Agent, or Firm* — Richard Eldredge; Leavitt Eldredge

(57) ABSTRACT

A vehicle relay racing system that employs a dual seat racing chair to allow two drivers to switch driving positions within a single vehicle without physically exiting the vehicle is disclosed. The dual seat racing chair includes a swivel mechanism configured to rotate 180 degrees, and thus allow the two drivers to switch driving positions. In alternative embodiments, a dual seat gaming chair is configured to be used in video gaming or other computer-based gaming applications.

1 Claim, 5 Drawing Sheets

VEHICLE RELAY RACING SYSTEM AND METHOD THEREOF

BACKGROUND

1. Field of the Invention

The present invention relates generally to vehicle racing systems, and more specifically to a vehicle relay racing system that employs a dual seat racing chair to allow two drivers to occupy a single vehicle in both mobile and non-mobile racing applications, thereby providing for team sport elements to vehicle racing.

2. Description of Related Art

The popularity of vehicle racing has grown dramatically in recent years. Traditionally, vehicle racing is an individual sport, i.e., vehicle racing involves one driver competing against another individual driver. This form of racing requires skill and endurance of one driver and has been the accepted approach for competitive racing for decades. Because of this, vehicle racing innovation has primarily focused on racing chairs to promote safety and comfort of the individual driver. For example, many racing chairs are designed to increase driver 'feel' and reduce driver fatigue during real-life vehicle racing. Other racing chairs simulate real-time vehicle racing in racing video games to enhance a player's entertainment and gaming experiences.

One of the problems commonly associated with vehicle racing is that it is primarily an individual sport. It is well known that team sports provide excitement and entertainment for both the participants and spectators. In addition, team sports enable participants to build teamwork, problem-solving, and communication skills which can be carried over into their daily lives. Hence, it would be advantageous to have a system that provides for vehicle racing based on a team sport concept.

In one aspect, the present invention aims to provide a system that incorporates relay race elements into vehicle racing, wherein a first driver "passes the driving baton" over to their teammate driver without leaving the vehicle.

In other aspects, the present invention aims to provide a dual seat racing chair that allows two alternate drivers to operate a vehicle without physically leaving the vehicle.

In yet further aspects, the present invention aims to provide a dual seat gaming chair to be utilized in video gaming and other computer-based gaming applications.

SUMMARY OF THE INVENTION

In one first broad aspect, the present invention discloses a vehicle relay racing system requiring a team of two drivers to alternately operate a racing vehicle and collectively compete as a team on a racetrack. The two drivers operate the racing vehicle and exchange driving positions without physically removing themselves from the motor vehicle. A dual seat racing chair is configured to seat the two drivers back-to-back and is configured to allow the exchange of driving positions between the two drivers via a swivel mechanism. The dual seat racing chair is mounted to the racing vehicle via the swivel mechanism.

After operating for a designated number of laps or time on the racetrack, the two drivers enter a driver exchange fly zone. Once the vehicle is in the fly zone, the two drivers must unlock the dual seat racing chair. After the dual seat racing chair have been unlocked, the racing vehicle automatically switches to an autonomous self-driving mode. While in this autonomous self-driving mode, the drivers can rotate the dual seat racing chair 180 degrees, allowing the safe exchange of drivers while in the fly zone. Speed sensors located at the fly zone entrance activate speed governors located on the racing vehicle. The speed governors slow the vehicle once the racing vehicle enters the fly zone. This reduction of speed allows for the racing vehicle to operate safely while in self-driving mode. No passing or lane switching is allowed in this fly zone. Speed can only increase after the drivers have switched positions and the seats have been re-engaged and locked into driving position. This driver exchange concept creates a driving relay team, of two, to operate the motor vehicle. The drivers combine their driving skills to win the racing contest.

In a related, second, broad aspect of the present invention provides for a dual seat gaming chair to be utilized in video gaming and other computer-based gaming applications. The dual seat gaming chair is configured to seat two players back-to-back and is configured to allow the exchange of seating positions between the two players via a swivel mechanism. The dual seat gaming chair is mounted to an enclosure via the swivel mechanism. The dual seat gaming chair includes a navigation device and a targeting device.

In use, each player may perform a specific gaming duty while interacting with one or more media presentations within an audiovisual enclosure. The gaming duties carried out are dependent on the position a player is facing. If the first player is facing the navigation device the assigned duty will be navigating around the gaming course environment. If the second contestant is facing the targeting device the assigned duties will be targeting competitors, stationary and mobile images displayed on the enclosure. This gaming experience can be enhanced with the introduction of holograms inside the enclosure to simulate up close obstacles and projectiles to avoid. The holograms can be programmed to exit the flat screen enclosure surface once it crosses a cutting plane/bubble defined in the game. This cutting plane can move as the players move through the gaming environment. This creates a mobile virtual bubble surrounding the seating apparatus as the players navigate the open game environment. If an object or online competitor encroaches into this bubble then a programmed relay can occur where two-dimensional images are transferred to the holographic projector utilizing the objects speed and angle of entry to simulate a true oncoming three-dimensional element within the enclosure. Players can switch duty positions during the game by swiveling 180 degrees to assume new gaming duties.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
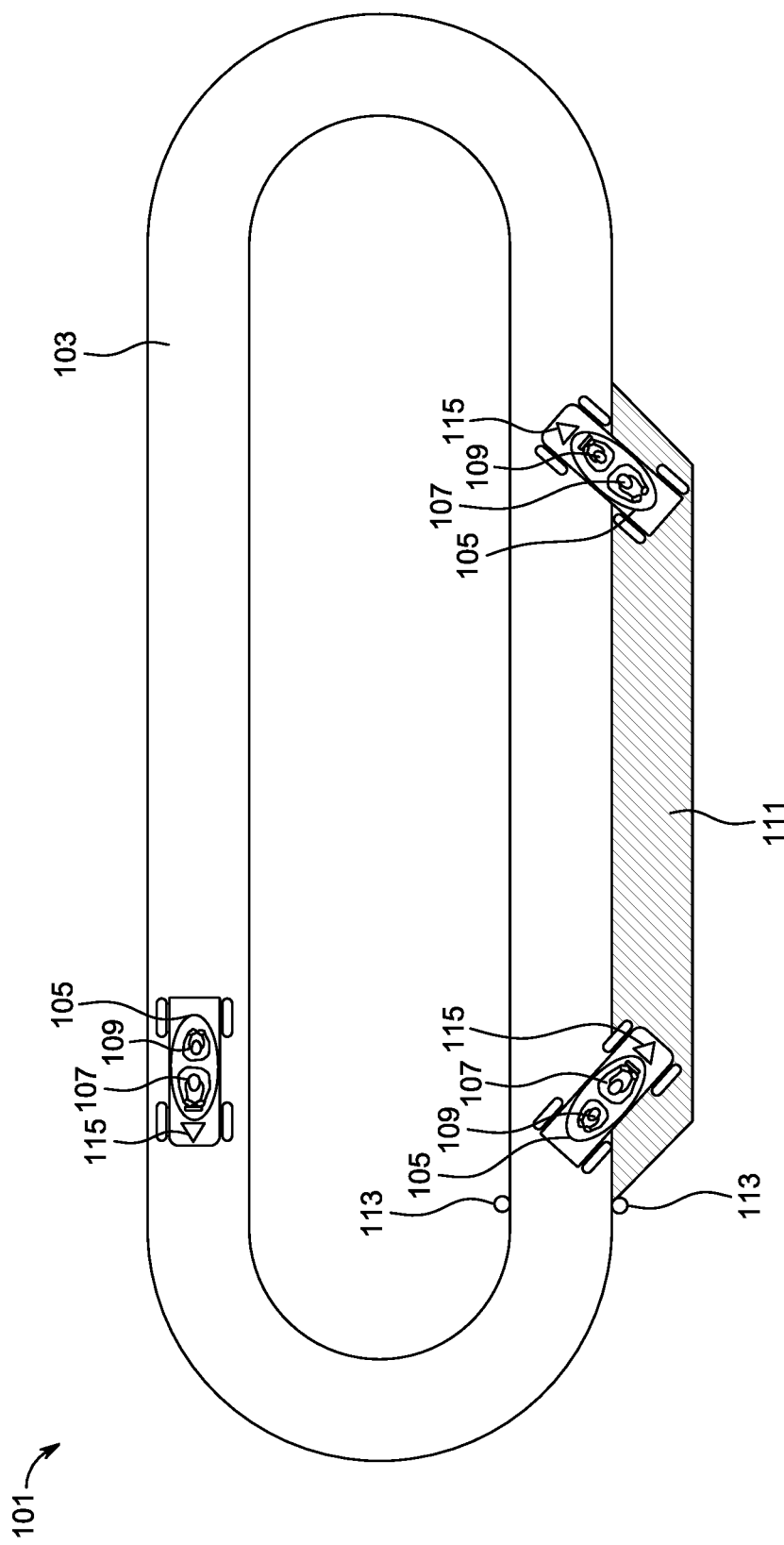
FIG. 1. is a schematic representation of a vehicle relay racing system in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vehicle racing systems. Specifically, the system of the present invention utilizes a dual seat racing chair that enables two users to coordinate together in a vehicle racing game. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a schematic representation of a vehicle relay racing system 101 in accordance with a preferred embodiment of the present application. It will be appreciated that the vehicle relay racing system 101 overcomes one or more of the above-listed problems commonly associated with conventional vehicle racing systems.

In the contemplated embodiment, the vehicle relay racing system 101 includes a racetrack 103 having at least one mobile vehicle 105 competing thereon. It should be appreciated that although the racetrack 103 is shown to have an oblong loop configuration, it is contemplated that the racetrack 103 can include any other suitable configuration, i.e., rectangular, triangular, linear, circular, oval or another appropriate geometry. In addition, it should be appreciated that the racetrack 103 can include any type of track surface including, without limitation, dirt, grass, turf, concrete, brick, asphalt, synthetic, or any combination or multiplicity thereof.

Each vehicle 105 represents a team of two drivers, for instance, a first driver 107 and a second driver 109. The drivers 107, 109 are seated back-to-back within a dual seat racing chair 201 (not shown, see FIGS. 2A and 2B).

The vehicle relay racing system 101 also includes a driver exchange fly-zone 111 adjacent to the racetrack 103. The fly-zone 111 includes one or more speed sensors 113 preferably located at the entrance of the fly-zone 111.

The vehicle relay racing system 101 further includes one or more speed governors 115 coupled to the vehicle 105. The one or more speed governors 115 are configured to slow the vehicle 105 to a designated speed. It should be appreciated that although the one or more speed governors 115 are shown on the top of the vehicle 105, it is contemplated that the one or more speed governors 115 could vary in location, size, style, and the like.

It should also be appreciated that the vehicle relay racing system 101 may vary based on aesthetical, functional, or manufacturing considerations.

Figure 2A:
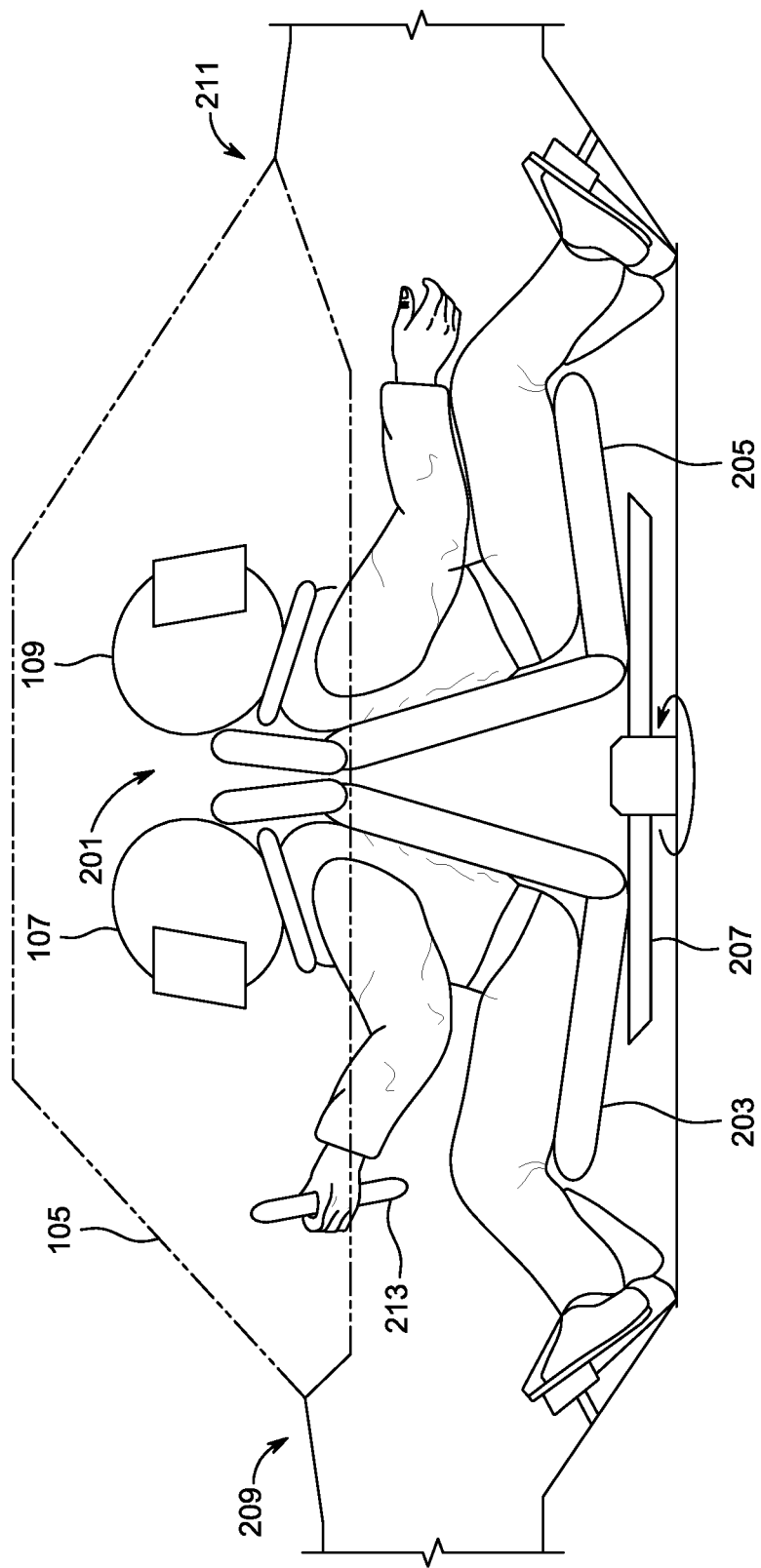
FIG. 2A is a profile view of a dual seat racing chair installed within the racing vehicle of FIG. 1, showing the first and second drivers sitting back-to-back.
Figure 2B:
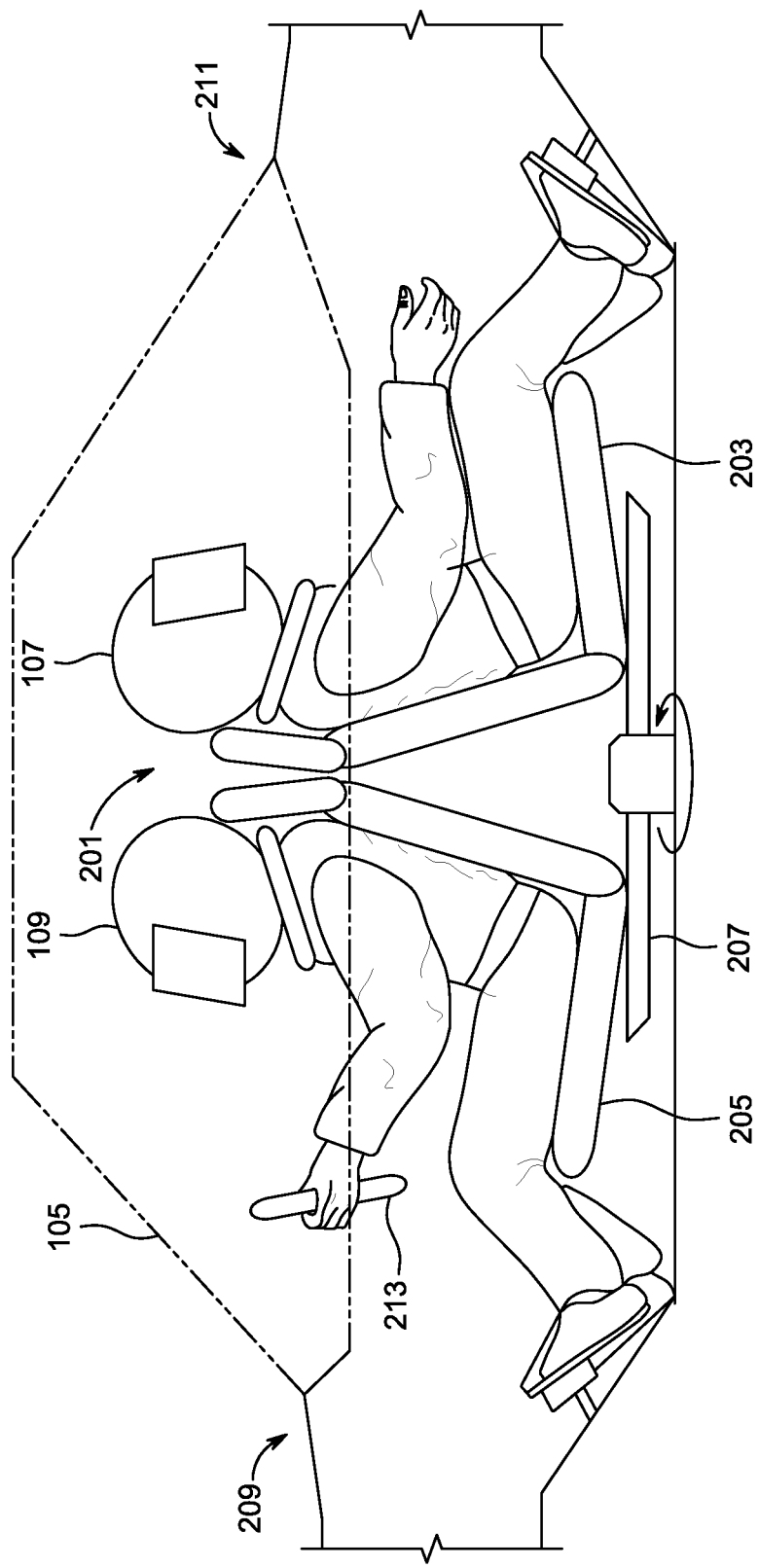
FIG. 2B is a profile view of a dual seat racing chair installed within the racing vehicle of FIG. 1, showing the first and second drivers sitting back-to-back after rotating 180 degrees from the position illustrated in FIG. 2A.

In FIGS. 2A and 2B, profile views of a dual seat racing chair 201 installed within the racing vehicle 105 of FIG. 1 are depicted. As shown, the dual seat racing chair 201 is configured to seat the drivers 107, 109 back-to-back in which the drivers 107, 109 face in opposite directions. In FIG. 2A, the first driver 107 is shown facing forward and engaging with a navigation device 213 while the second driver 109 is shown facing rearward.

The dual seat racing chair 201 includes a first seat 203 and a second seat 205 mounted to a swivel mechanism 207. The swivel mechanism 207 couples the seats 203, 205 to the vehicle 105. The swivel mechanism 207 is configured to rotate the seats 203, 205 at approximately 180 degrees, as shown with directional arrows. It should be appreciated that the swivel mechanism 207 may include a plurality of components suitable to allow rotational movement of the seats 203, 205 such as rotary unions, mechanical gears, magnets, combinations of various components, or the like.

In the preferred embodiment, the dual seat racing chair 201 includes a locking mechanism (not shown) configured to secure the seats 203, 205 to a desired position. For example, the drivers 107, 109 can engage the locking mechanism to position the first driver 107 facing forward in the front end 209 of the vehicle 105 and the second driver 109 facing rearward in the rear end 211 of the vehicle 105. Also, in the preferred embodiment, upon the disengagement of the locking mechanism, the vehicle 105 can enter into an autonomous driving mode so that drivers 107, 109 can rotate 180 degrees via the swivel mechanism 207.

It should be appreciated that during use, when the vehicle 105 enters into the driver exchange fly-zone 111, the vehicle 105 passes the one or more speed sensors 113. The one or more speed sensors 113 activate the one or more speed governors 115 to slow the vehicle 105 down to a designated speed. After the vehicle slows to the designated safe speed, the first driver 107, second driver 109, or both can disengage the locking mechanism. Once the locking mechanism is disengaged, the drivers 107, 109 can rotate 180 degrees via the swivel mechanism 207. As shown in FIG. 2B, the first driver 107 now faces rearward while the second driver 109 faces forward. When the first driver 107, second driver 109, or both engage the locking mechanism, the second driver 109 can assume driving duties until the race is finished or until another driver exchange is required.

Figure 3A:
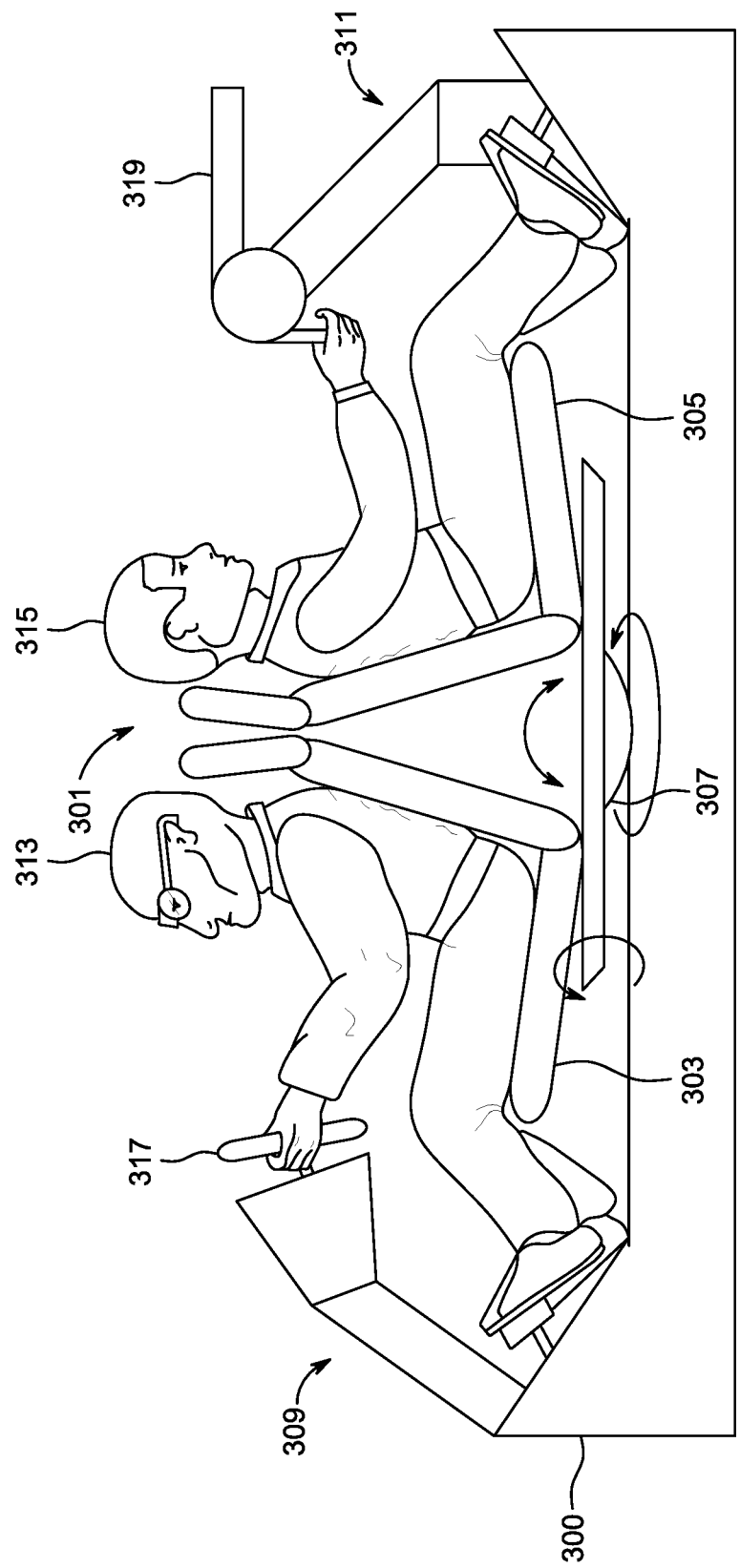
FIG. 3A is a profile view of an alternative stationary dual seat gaming chair installed within an enclosure for video gaming, showing the first and second drivers sitting back-to-back.
Figure 3B:
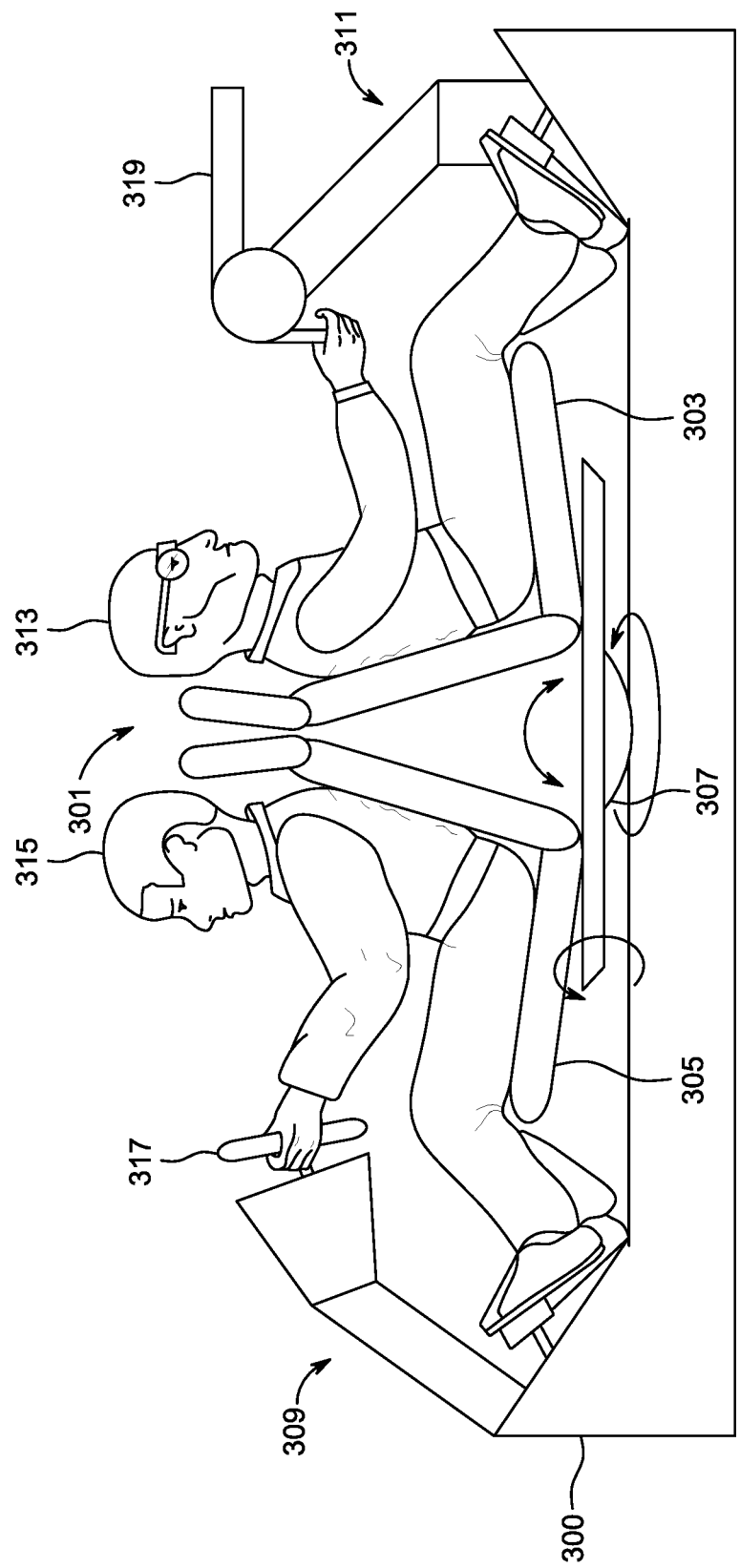
FIG. 3B is a profile view of an alternative stationary dual seat gaming chair installed within an enclosure for video gaming, showing the first and second drivers sitting back-to-back after rotating 180 degrees from the position illustrated in FIG. 3A.

Referring now to FIGS. 3A and 3B, profile views of an alternative stationary dual seat gaming chair 301 installed within an enclosure 300 for video gaming are depicted. It should be appreciated that the dual seat gaming chair 301 may be utilized in other computer-based gaming applications such as an arcade game, video console games, and the like.

As shown, the dual seat gaming chair 301 includes a first seat 303 and a second seat 305 mounted to a swivel mechanism 307. The swivel mechanism 307 is configured to enable swivel movement as well as movements along pitch, yaw, and roll axes, as shown with directional arrows. The swivel mechanism 307 couples the dual seat gaming chair 301 to the enclosure 300. It should be appreciated that the swivel mechanism 307 may include a plurality of components suitable to allow rotational, pitch, yaw, and roll movements of the seats 303, 305 such as rotary unions, mechanical gears, magnets, combinations of various components, or the like.

In addition, as shown, the dual seat gaming chair 301 is configured to seat a first player 313 and a second player 315 back-to-back in which the players 313, 315 face in opposite directions. In FIG. 3A, the first player 313 is shown facing forward in the front end 309 of the enclosure 300 engaging with a navigation device 317 while the second player 315 is shown facing rearward in the rear end 311 of the enclosure 300 engaging with a targeting device 319.

It should be appreciated that the enclosure 300 provides an audiovisual enclosure to simulate one or more three-dimensional scenes. For example, the audiovisual enclosure may use light projectors, screens, monitors, sound systems, and the like to display one or more media presentations to the players 313, 315. In addition, the audiovisual enclosure may dynamically interact with the players 313, 315 to provide a more entertaining experience.

It should also be appreciated that during use, each player may perform a specific gaming duty while interacting with the one or more media presentations from within the audiovisual enclosure. For example, as shown in FIG. 3A, the first player 313 interacts with the navigation device 317 to carry out one gaming duty whereas the second player 315 interacts with the targeting device 319 to carry out another gaming duty. The players 313, 315 may switch gaming duties by switching positions via the swivel mechanism 307, as shown in FIG. 3B.

It should also be appreciated that one of the unique features believed characteristic of the present application is the back-to-back seating configuration of the dual seat racing chair 201 and the dual seat gaming chair 301 that enable two users to alternate duties within mobile and nonmobile applications, thereby enhancing user experience.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vehicle relay racing system, comprising:
   a racetrack, the racetrack having:
      a designated area for allowing a first driver and a second driver to exchange driving positions; and
      one or more speed sensors;
   at least one vehicle, the vehicle having:
      a body that extends from a front end and a rear end;
      a navigation device coupled to the front end;
      one or more speed governors configured to slow the vehicle to a designated speed;
      a dual seat racing chair configured to seat the first driver and the second driver back-to-back to face in opposite directions;
      a first seat configured to seat the first driver;
      a second seat configured to seat the second driver, the second seat is positioned against and in an opposition direction to the first seat;
      a swivel mechanism secured to the body and to both the first seat and the second seat, the swivel mechanism is configured to simultaneously rotate the first seat and second seats;
   wherein the swivel mechanism solely allows rotational movement of the first seat and the second seat while the at least one vehicle is within the designated area.

* * * * *